United States Patent Office

3,576,775
Patented Apr. 27, 1971

3,576,775
LOW TEMPERATURE CURING WOOD COATINGS
Rolf Jaegersberg, Louisville, Ky., assignor to Celanese Coatings Company, New York, N.Y.
No Drawing. Filed Aug. 14, 1969, Ser. No. 850,252
Int. Cl. C09d 3/52, 3/66
U.S. Cl. 260—21                               7 Claims

ABSTRACT OF THE DISCLOSURE

A coating composition comprising a blend of an alkyd resin, a styrene-allyl alcohol copolymer, a hexa-alkoxy methyl melamine resin and an alkoxy urea-aldehyde resin dissolved in a solution of a non-reactive low boiling solvent and a low boiling alcohol is prepared. The composition is applied to wood products and is cured by low temperature baking.

BACKGROUND OF THE INVENTION

The field of art to which this invention pertains is synthetic resin mixtures of amine-aldeyde and urea-aldehyde reaction products with polyol-polybasic carboxylic acid polyesters. More particularly this invention relates to a modification of said synthetic resin mixtures with a styrene-allyl alcohol copolymer so as to form a low temperature curable coating composition for application to wood products.

The use of alkyd resins in conjunction with melamine resins or urea-aldehyde resins in baking applications is well known in the art. Likewise, the application of alkyd resins to wood surfaces is known. Normally, to convert a standard baking alkyd to one which can be applied to wood, the original coating solution is modified with a large amount of an acid catalyst. This procedure produces solutions which have generally poor stability and which will gel within a few hours after catalyzation. Thus coatings prepared by this modified method must be applied to the surface to be coated shortly after catalyzation. Otherwise, solution viscosity will eventually increase to a point where application is nearly impossible. Finally, gelation will result causing the loss of a large amount of costly coating materials.

Yet another disadvantage of systems prepared in this manner is that, even with the large amount of catalyst used, complete cure is difficult or impossible under the conditions preferably present when wood is to be coated. This lack of complete cure results in films which have inadequate hardness, mar and solvent resistance. Although most of these highly catalyzed alkyd resin coatings will eventually post cure at room temperature to a finish possessing sufficient resistance properties, this process of continued curing after baking can take several weeks. When articles such as wood stock are stacked or packaged immediately after coating, this lack of complete cure causes undesirable marring and scratching of the coated material. A final disadvantage of these systems is that even when adequately cured they are still quite susceptible to water spotting and attack from various stains such as mustard, cola, etc.

Nitrocellulose catalyzed lacquers are also well known in the art and have often been used in place of alkyd resins where faster curing at low temperatures is required. However, as with the aforementioned highly catalyzed alkyd resin systems, these nitrocellulose lacquers also are quite unstable when catalyzed to provide low temperature curing. In addition, their resulting cured coatings tend to be extremely brittle. When nitrocellulose lacquers are catalyzed so as to produce stable solutions, cure response is lost and the cured films from these stable solutions exhibit poor resistance properties. Finally, unlike alkyd resin coatings any of these lacquers require the use of expensive ketones and ester solvents to reduce solution solids to a suitable application viscosity.

Nitrocellulose lacquers in addition are quite susceptible to spotting from various solvents and stains. Finally, nitrocellulose lacquers are quite flammable and will burn readily with the application of only a small amount of heat.

In order to overcome the above problems, alkyd resins have been modified with urea-aldehyde resin but these blends also have several undesirable properties when applied as a wood finish. In the first place, pot life is very short with gelation often resulting within 3–12 hours after catalysis. Secondly, water resistance is very poor. Finally, the applied coatings are quite hard and inflexible and have very poor gloss retention. This gloss problem is readily observed when gloss readings are taken immediately after baking and compared with those obtained a week or ten days later. Generally, gloss will drop from 10–15 degrees over this period.

Alkyd resin-melamine resin blends have also been applied as wood finishes but they too have several drawbacks. In general cure response is much poorer than in either nitrocellulose lacquers or alkyd urea-aldehyde systems. Although pot life and water resistance properties are much improved over alkyd-urea systems, the films prepared from these alkyd-melamine blends are generally quite soft and susceptible to marring and scratching. Finally these resin blends contrary to corresponding alkyd-urea-aldehyde blends actually increase in gloss as much as 10–15 degrees during the 7–10 day period following the initial application bake.

But the worst problem exhibited by conventional wood finishes is their lack of resistance to alkali attack. This problem is equally evident in nitrocellulose lacquers, alkyd-urea, and alkyd-melamine blends. Often merely cleaning furniture surfaces coated with these resins with soap and warm water will cause severe discoloration of the coating.

Thus, to summarize, previously known wood coatings have exhibited problems in the following areas: (1) stain resistance, (2) alkali resistance, (3) solvent resistance, (4) pot stability, (5) gloss stability, and (6) hardness and flexibility.

SUMMARY OF THE INVENTION

Utilizing the compositions of this invention low temperature curable coatings are prepared which exhibit several distinct improvements over unmodified alkyd resin-melamine or urea-aldehyde coatings or nitrocellulose lacquers. The compositions of this invention have increased pot life; offer cure rates at least equal to and in most cases superior to nitrocellulose lacquers; and produce films which are superior to lacquers and alkyds in mar, solvent, water, and stain resistance and overall film hardness and gloss retention.

The coating compositions disclosed herein comprise a mixture of about 45 to about 70 weight percent of an alkyd resin having a hydroxyl content of about 1.3 to about 10 weight percent and a solids acid value of at least 2; about 3.5 to about 20 weight percent of monomeric or partially polymerized $C_1$ to $C_5$ hexa-alkoxy methyl melamine resin having a Gardner-Holdt (25° C.) viscosity of about P to about $Z_6$ at 100 percent solids; about 10 to about 35 weight percent of a $C_1$ to $C_5$ alkoxy urea-aldehyde resin and about 2 to about 25 weight percent of a styrene-allyl alcohol copolymer having an hydroxyl content of from about 4 weight percent to about 10 weight percent. This mixture is dissolved in a solution of about 15 to 100 weight percent of a $C_1$ to $C_5$ alcohol having a boiling range of about 140° F. to 325° F. and about 85 to 0 weight percent of a non-reactive liquid solvent having a boiling point range of about 85° F. to about 325° F.

This coating composition can be applied to a wood substrate and baked at a temperature of about 100° F. to 275° F. for about 1 minute to 1 hour producing a coating having excellent cure, hardness, solvent, stain and mar resistance, and gloss stability. At the same time the substrate is not injured or degraded by the low temperature baking which is possible because of the rapid curing properties of this coating.

DESCRIPTION OF THE INVENTION

The term alkyd resin for the purposes of this invention is defined as any ester resin prepared by reacting a polyol with polybasic acid or a mixture of polybasic acids and mono basic acids. Included in this definition are oil or fatty acid containing polyesters.

The alkyd resins used in preparing the compositions of this invention include those types normally used in baking or air drying applications. These resins can contain up to no more than about 45 weight percent of an oil or fatty acid. When the fatty acid or oil concentration is increased above the 45 weight percent level cure response is lost and the resulting films are soft and subject to mar and solvent attack. However, alkyd resins can be prepared which contain no fatty compound and are based upon polyols and polyacids only. These alkyd resins or oil-less alkyds are especially useful for exterior applications and have a high degree of flexibility, adhesion, and possess unique elongation properties. Preferably, though, the fatty compound should be present in an amount equal to about 20 to about 45 weight percent of the total alkyd resin solids with the most preferable range being about 35 to 45 weight percent.

In addition the particular alkyd resin which is chosen should have a solids acid value of at least 2. Lower acid value alkyds exhibit poor cure response and film resistance properties. Preferably the acid value of the selected alkyd should be in the 6 to 12 acid value range, however, alkyds with an acid value as high as 30 can also be employed with only minor stability problems.

Finally, in order to insure proper interaction between the alkyd resin and the melamine and urea curing agents, the alkyd resin should have an hydroxyl content of from about 1.3 weight percent to about 10 weight percent, preferably about 2.0 to 6.0 weight percent. Hydroxyl content is defined as the weight ratio of hydroxyl groups per 100 parts of solid alkyd resin. Thus an alkyd resin having one equivalent of hydroxyl groups per 100 parts of resin would have a weight percent hydroxyl content of 17/100 or 17 percent.

When a fatty compound is present in the alkyd resins of this invention, it can comprise any of the fatty acids or oils ordinarily used in preparing alkyd resins. Included are the following oils and their respectively derived fatty acids: tall, safflower, tung, tallow, soya, corn, linseed, poppyseed, castor, dehydrated castor, perilla, cocoanut, oiticica, and the like. Of special usefulness are those fatty compounds wherein the fatty acid portion contains from 12 to 24 carbon atoms per molecule.

An additional component of the alkyd resins of this invention is a polyol or a mixture of polyols. Among the polyols which can be utilized are those normally used in producing alkyd resins including pentaerythritol, glycerine, trimethyol propane, trimethyol ethane and the various glycols such as neopentyl, ethylene and propylene. Preferable among the above types of polyols are triols or mixtures of a major amount of a triol and a minor amount of tetra-alcohol.

Typical of the carboxylic acids, in addition to the aforementioned fatty acids, are phthalic anhydride, isophthalic acid, adipic acid, azelaic acid, benzoic acid, etc. These acids can readily be replaced by any of the additional acids normally used in alkyd resin processing. The preferred system in addition to including the aforementioned preferred levels of a fatty compound should contain an aromatic dibasic acid or a mixture of said aromatic acid with an aliphatic dibasic acid.

An alkyd resin having the above constituents can be prepared by any of the standard alkyd processing techniques. However, the preferred alkyd resins are prepared by alcoholizing an oil with excess polyol, and then using this alcoholysis product as a reactant with the selected polybasic acids and additional polyol. When the resin has been prepared by these methods, the resulting polymer can be mixed with the remaining parts of components used in this invention, or this polymer can be dissolved in the solvents hereafter described and then blended with the remaining components in the form of a solvent solution.

The amount of alkyd resin that can be blended with the other components of this invention can vary from 45 to 70 solids weight percent based on the total composition solids. Preferable results, though, are obtained when the alkyd resin is present in the 55 to 65 weight percent range. When the amount of the alkyd resin is increased above the 70 weight percent level, cure response suffers and solvent resistance, alkali resistance, and hardness are reduced.

The second component of this invention is a monomeric or partially polymerized hexa-alkoxy methyl melamine resin having a Gardner-Holdt viscosity (25° C.) of about P to $Z_6$ at about 100% solids. In some cases highly pure melamine resins will crystallize upon standing. However, viscosity readings can be obtained by melting the resin at elevated temperature and then quicky cooling to 25° C. This melamine resin can be present in amount of from about 3.5 to 20 weight percent based on the total solids composition. However, the 5 to 10 weight percent range is preferred. When the melamine resin content is reduced below 3.5 percent, pot life suffers and gloss tends to decrease after baking. On the other hand increasing the melamine resin content above the 20% level increases the cost of the finished coating, causes the film gloss to increase after baking, and, due to the plasticizing effect of the excess melamine resin present, films tend to be soft and quite susceptible to solvent attack and marring.

The preferred hexa-alkoxy methyl melamines are those derived from $C_1$ to $C_5$ alcohols including methyl, ethyl, the propyl, the butyl, and the amyl alcohols. When higher carbon containing alcohols are present in these melamine resins, cure response is lost due to the reduced reactivity of these higher alcohol containing curing agents. Preferred among the $C_1$ to $C_5$ alkoxy methyl melamines are the $C_1$ to $C_3$ alkoxy methyl melamines with the most preferred being those melamines containing methoxy groups, e.g., hexamethoxy methyl melamine.

An additional component of this invention is an alkoxy urea-aldehyde resin. Typically these resins are prepared by reacting about 1.5 to 3.0 mols of the desired aldehyde preferably formaldehyde with each mol of urea and further reacting the resulting reaction product with about 1.0 to 3.0 mols of alcohol. The most useful alcohols for the purposes of this invention are those having 5 or less carbon atoms. Included are methyl, ethyl, the propyl, the butyl and the amyl alcohols. The use of higher boiling alcohols results in coating compositions which have very sluggish cure rates. Preferred among these $C_1$-$C_5$ alcohols are the propyl and butyl alcohols.

This alkoxy urea-aldehyde resin can be present in amounts ranging from about 10 to 35 weight percent of the total solids content of the coating composition. Increasing the urea resin content above the 35 percent level produces films which are too brittle and low in gloss, while reducing the resin content below the 10 percent level produces films which are soft and slow to cure. In addition high urea resin content (above 35%) produces films which tend to decrease in gloss after baking. Low urea resin coatings, on the other hand, tend to increase in gloss after baking. Preferred results are obtained when the urea resin content is maintained in the 20 to 30 percent range.

Styrene-allyl alcohol copolymers as used in the compositions of this invention comprise those copolymers prepared by reacting styrene and allyl alcohol in a weight ratio so as to yield a polymer containing about 4 to about 10 weight percent hydroxyl group. In other words the allyl alcohol content can vary from about 13.5 to about 34 weight percent of the total copolymer solids. Typical of these copolymers are those prepared by the methods of U.S. Pat. 2,894,938. Most preferable of these copolymers are those which are prepared having an hydroxyl content of about 5 to about 6 weight percent.

The total concentration of these styrene-allyl alcohol copolymers can vary from about 2 to about 25 weight percent based on the total composition solids. When the styrene-allyl alcohol copolymer content is reduced below the 2 weight percent level, solvent resistance, alkali resistance, and film hardness suffer. On the other hand when this concentration is increased above the 25 weight percent level, the resulting cured film is gummy and overall cure response is retarded. In general the most preferred results are obtained when the styrene-allyl alcohol copolymer content is maintained in the 4 to 12 weight percent range.

In preparing solutions of the above components several methods can be employed. In one method the melamine resin, urea resin, alkyd resin and styrene-allyl alcohol copolymers are each individually dissolved in the desired solvents and then these various solutions are blended together. In another method the above components are blended together and then this blend is dissolved in the solvents of choice. However, in the preferred method the alkyd resin is first dissolved in enough of the desired solvent to give it a workable viscosity (Gardner-Holdt at 25° C. of about less than $Z_8$). This resin solution is then added to a similar solution of the alkoxy urea-aldehyde resin, the remainder of the components and the desired amount of additional solvents. Agitation of any of the above solutions produces a homogeneous coating composition having a solids content of about 30 to 50 weight percent.

In order to apply and cure the compositions of this invention at a temperature sufficiently low to prevent injury to and degradation of the wood substrate, solvents with boiling points below about 350° F. should be used. In addition, at least about 15 weight percent of this solvent content should comprise a $C_1$ to $C_5$ alcohol. This amount of alcohol is present in order to control the cure rate of the compositions of this invention. When amounts of alcohol less than about 15 weight percent of the total volatile content are present, cure response (the ability of the coating to cure to a tack free solvent resistant film) is lost in 48 to 60 hours. However, when at least about 15 weight percent alcohol is used cure response is maintained for 72 hours. or longer. Preferably the alcohol content should be in the 35 to 45 weight percent range; however, solutions where the only solvent present is an alcohol are quite usable and produce acceptable results.

Among the alcohols which are of use as solvents in this invention are those having from 1 to 5 carbon atoms per molecule including methyl, ethyl, the propyl, the butyl, and the amyl alcohols. In addition, however, the boiling point of the chosen alcohols should be between 140° F. and 325° F. Alcohols which boil higher than about 325° F. require baking temperatures which tend to harm various wooden substrata. The preferred alcohols from this $C_1$ to $C_5$ group are normal propanol, isopropanol and butanol.

The other solvent used in conjunction with the aforementioned alcohols is a non-reactive or inert liquid solvent, having no functional groups reactive with alcohols, carboxylic acids or vinyl compounds. This solvent can be present in an amount equal to from 85 to 0, preferably 65 to 55, weight percent of the total solvent composition. Included among the preferred solvents of this class are, toluene, xylene, ethyl benzene, VM&P naphtha, hexane and other aliphatic and aromatic solvents. Of special usefulness are xylene, toluene and VM&P naphtha. In addition as was discussed above, solvents for use in this invention should have a low boiling point because of the danger of heat injury to the wood that is used. Preferably this other inert liquid solvent should therefore have a boiling range of about 85° F. to about 325° F. However, a small amount of this inert solvent can include a solvent with a boiling point higher than 325° F.

When the coating compositions as prepared above are to be applied to a substrata such as plywood which will immediately after baking be subject to abrasive forces such as are present when materials are stacked together, additional freedom from tack and mar is desirable. When this additional property is needed, a waxy substance can be added. Included among these waxes are carnauba, polyethylene, and candelilla waves as well as other synthetic and naturally occurring waxes. These waxes for preferred results should be added in an amount equal to about 0.25 to 4 weight percent based on the total solids of the coating composition.

In order to achieve low temperature curing using the compositions of this invention an acid catalyst must be used. Included are catalysts such as para-toluene sulfonic acid, methane sulfonic acid, butyl acid phosphate, hydrochloric acid, and other organic and mineral acids having at least one active hydrogen group per molecule. Preferred among these catalysts is para toluene sulfonic acid. Catalyst concentration can range from about 0.25 to about 6% based on the total volume of the final coating depending upon the final end use. Thus when the coating is to be employed as a sealer as low as 0.25 to 1.0% catalyst can be employed. On the other hand hand when the coating is to be used as a topcoat more complete cure is required and therefore from 2 to 6 volume percent catalyst is needed. It should be noted that since most of the above acid catalysts are crystalline at room temperature, solutions at about 50% solids in methanol or another solvent having a boiling point of less than about 325° F. are prepared to facilitate handling. The above volume percents are based on the addition of a 50% solids solution of these catalysts. Although this method is preferred the catalysts can be added in their 100% solids crystalline form if sufficient agitation is used to dissolve the solid catalyst in the coating solution.

If a lower gloss coating is desired the compositions as prepared above can be further modified with from about 5 to about 25 weight percent of a flattening agent such as silica gel or other silicon or silicate containing materials.

In addition to the above components, the coating compositions of this invention can be further modified with the various additives normally used in coatings application. Included are flow control agents such as silicone oils, wetting agents, dispersing agents, and antisettling agents.

DESCRIPTION OF PREFERRED EMBODIMENTS

In the following examples parts are understood to mean parts by weight.

Solution A

Into a suitable reaction flask equipped with a mechanical agitator, thermometer, sampling device, and distillation arm were added 39.77 parts of dehydrated castor oil and 14.00 parts of glycerine. This mixture was heated to 450° F. in the presence of 0.05 part of calcium acetate. When this alcoholysis reaction was completed 10.56 additional parts of glycerine were added to the reaction flask along with 40.61 parts of phthalic anhydride. Refluxing this mixture at 385° F. in xylene produced a resin which when reduced to 60 weight percent solids in a 95 weight percent xylene and 5 weight percent butanol solvent mixture exhibited a Gardner color of 7, a solids acid value of 6 and a Gardner-Holdt 25° C. viscosity of $Z_3$.

Solution B

In a reaction flask equipped as above 2.31 mols of formaldehyde were reacted with 1.00 mol of urea. The resulting product was then further reacted with 1.87 mols of butanol and reduced to 60 weight percent solids in 87.5 weight percent butanol and 12.5 weight percent xylene, yielding a butylated urea-formaldehyde resin solution having a Gardner-Holdt 25° C. viscosity of W–X, a solids acid value of 2 and a weight per gallon of 8.50 lbs. (25° C.).

Example I

Into a suitable container equipped with a mechanical agitator were added 15.04 parts of xylene and 2.61 parts of a flaked styrene-allyl alcohol copolymer having a solids acid number of less than 0.5, an hydroxyl content of 5.7, a specific gravity of 1.083, an approximate molecular weight of 1600 and an equivalent weight of about 300. This mixture was agitated until all of the styrene-allyl alcohol copolymer was dissolved in the xylene. To this resulting solution were added 38.64 parts of solution A. Added additionally were 3.71 parts of a hexamethoxy methyl melamine resin having a Gardner-Holdt viscosity (25° C.) of V, and a weight per gallon of 10.0 lbs.; 18.58 parts of solution B; 8.28 parts of butanol, and 9.19 parts of a silica gel based flaking agent. Agitation of this mixture produced a coating composition having a weight per gallon of 8.18 lbs., and a viscosity (25° C.) of 23 seconds on a #4 Ford cup.

38.4 gallons of a coating solution prepared in this manner were catalyzed with 1.6 gallons of a 50 percent by weight solution of para toluene sulfonic acid (PTSA) in methanol, applied to a wood furniture substrate and baked for 10 minutes at a temperature of 175° F. A clear coating resulted having a gloss of 18°–22° and excellent hardness and mar, alkali, solvent, and stain resistance.

Example II

Using the same procedure as in Example I, a coating composition was prepared using 46.48 parts of solution A, 16.99 parts of xylene, 8.75 parts of butanol, 2.76 parts of the styrene-allyl alcohol copolymer of Example I, 3.92 parts of the melamine resin of Example I, 19.60 parts of solution B, 0.92 part of a polyethylene dispersion and 0.58 part of silicone. This coating composition exhibited a solids content of 46.6 percent, a weight per gallon of 8.09 lbs., and a viscosity of 23 seconds on the #4 Ford cup (25° C.).

Catalyzing the above solution with 4 percent by volume of a 50 weight percent PTSA solution in methanol, applying it to furniture stock to a wet film thickness of 3.0 to 3.5 mils and baking for 10 minutes at an oven temperature of 175° F. produced an excellent film having a gloss of 90°–95° and a dry film thickness of 1.0–1.5 mils. Evaluations of this film indicated excellent solvent, stain, and mar resistance, and gloss stability.

Coatings prepared in this manner can be applied by any of the conventional methods including dipping, brushing, or spraying. When coatings are to be applied on a continuous painting line, the preferred methods are roller coating or curtain coating. After the wet coating is applied, the usual procedure is to flash as much of the solvent as possible out of the coating by a blast of high velocity air. This step, however, is not always practical or necessary. Following either the coating step or the flash step the coated material is passed directly into a baking oven where the coated substrate is baked at an oven temperature of about 100° F. to 275° F. for from about 1 minute or 1 hour. On the other hand when a furniture type substrate is to be coated, the preferred means of application is by spraying. As when roller or curtain coaters are used the sprayed substrate is either flashed with high velocity air and then baked or baked alone without this flash step.

Although baking of the coatings compositions of this invention is preferable, these compositions can also be air dried to an adequate degree of cure. In most cases air drying requires from 4–8 hours.

The wood substrata to which the compositions of this invention can be applied include furniture, hard board, wood siding, etc. This invention, however, is especially useful in furniture finishing where a high degree of stain resistance and gloss stability is required.

It is understood that the foregoing detailed description is given merely by way of illustration and that many variations may be made therein without departing from the spirit of the invention.

The embodiments of the invention in which an exclusive property or privilege is claimed are defined as follows:

1. A coating composition, which comprises a solution of:
   45–70 weight percent of an alkyd resin having a solids acid value of at least 2 and an hydroxy content of about 1.3 to 10 weight percent, and containing not more than about 45 weight percent of an oil, or fatty acid;
   3.5–20 weight percent of a monomeric or partially polymerized hexa-alkoxy methyl melamine resin having a Gardner-Holdt (25° C.) viscosity of about P to $Z_6$ at about 100 percent solids wherein said alkoxy group contains from 1 to 5 carbon atoms;
   10–35 weight percent of an alkoxy urea-aldehyde resin wherein said alkoxy group contains from 1 to 5 carbon atoms; and
   2 to 25 weight percent of a styrene-allyl alcohol copolymer having an hydroxyl content of from about 4 to about 10 weight percent,
dissolved in a solvent mixture of:
   15 to 100 weight percent of an alcohol solvent having a boiling point range of from about 140° F. to about 325° F. and a carbon content of about 1 to 5 carbon atoms per molecule; and
   85 to 0 weight percent of a non-reactive liquid solvent having a boiling point range of from about 85° F. to about 325° F., and
mixed with an acid catalyst.

2. The composition of claim 1 wherein the alkyd resin is based upon 20 to 45 solids weight percent of an oil or fatty acid derived from an oil wherein said fatty acid contains from 12 to 24 carbon atoms per molecule; wherein the alkoxy group of the hexa-alkoxy methyl melamine resin is methoxy; wherein the aldehyde of said alkoxy urea aldehyde resin is formaldehyde; wherein the styrene-allyl alcohol copolymer has a hydroxyl content of from 5 to 6 weight percent; wherein the alcohol solvent is selected from n-propanol, isopropanol and butanol, and the nonreactive liquid solvent is selected from xylene, VM&P naphtha and toluene.

3. The composition of claim 1 wherein the alkyd resin is present in an amount equal to about 55 to 65 weight percent of the total solids composition; the melamine resin is present in an amount equal to about 5 to 10 weight percent of the total solids composition; the alkoxy urea-aldehyde resin is present in an amount equal to about 20–30 weight percent of the total solids composition; the styrene-allyl alcohol copolymer is present in an amount equal to about 4 to 12 weight percent of the total solids composition; the alcohol solvent is present in an amount equal to about 35 to 45 weight percent of the total solvent; and the non-reactive solvent is present in an amount equal to about 65 to 55 weight percent of the total solvent.

4. The composition of claim 1 wherein the acid catalyst is added in a solution in an amount equal to about 0.25 to about 6 volume percent of the total volume of the composition of claim 1.

5. The composition of claim 4 wherein the acid catalyst solution is a solution of para toluene sulfonic acid.

6. The composition of claim 1 wherein a waxy substance is added in an amount equal to about 0.25 to 4 weight percent based on the total composition solids.

7. The composition of claim 6 wherein the waxy substance is selected from carnauba, polyethylene or candelilla waxes or mixtures thereof.

References Cited

UNITED STATES PATENTS

| | | | |
|---|---|---|---|
| 2,894,938 | 7/1959 | Chapin et al. | 260—88.1 |
| 3,425,974 | 2/1969 | Semroc | 260—21 |
| 3,444,113 | 5/1969 | Ackerman et al. | 260—21 |
| 3,451,955 | 6/1969 | Koral et al. | 260—21 |

DONALD E. CZAJA, Primary Examiner

R. W. GRIFFIN, Assistant Examiner

U.S. Cl. X.R.

117—148, 161, 168; 260—22, 23, 28, 28.5, 33.4, 33.6, 850, 855, 856